UNITED STATES PATENT OFFICE.

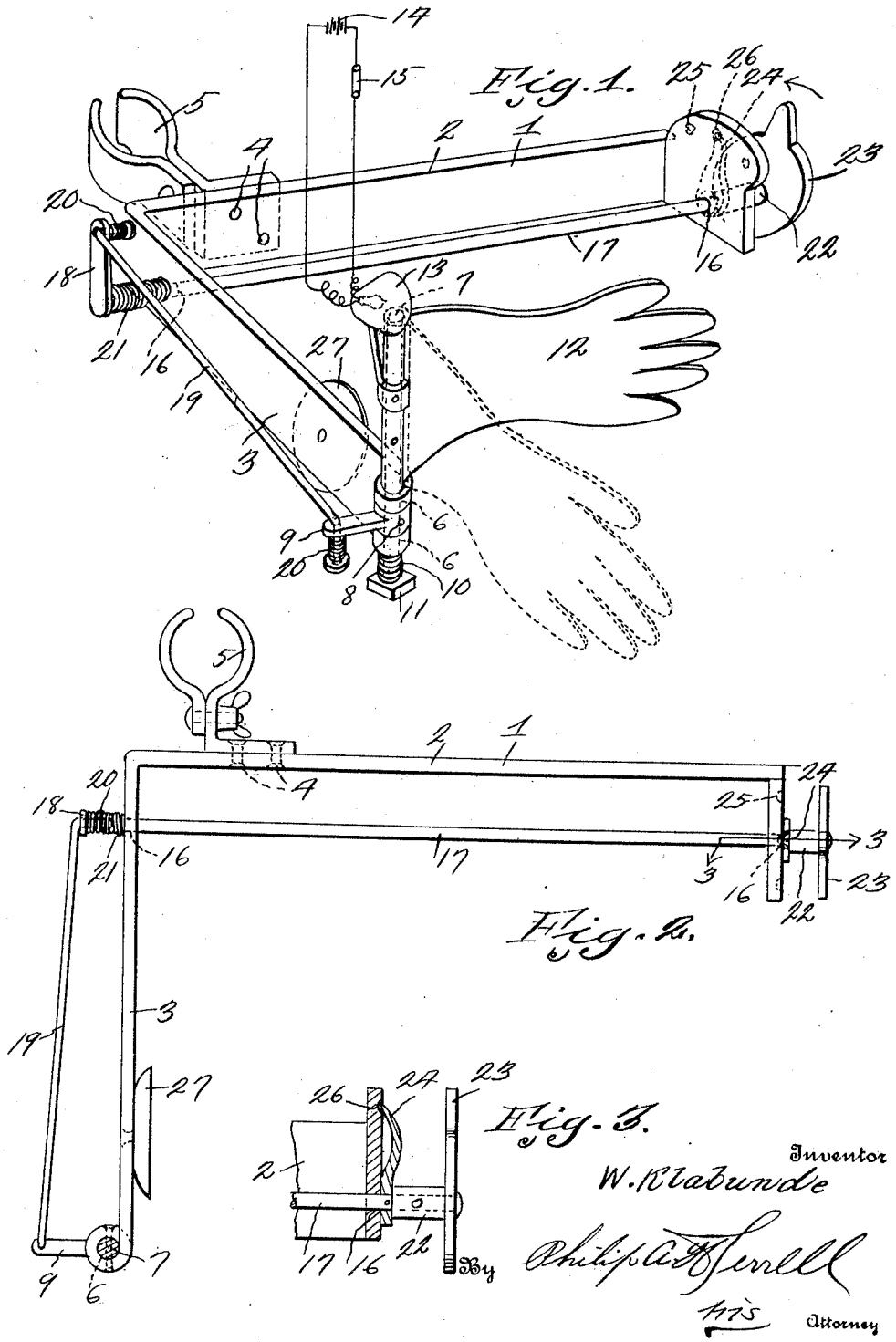

WILLIAM KLABUNDE, OF FLORENCE, NEBRASKA.

DIRECTION-INDICATOR.

1,367,190. Specification of Letters Patent. Patented Feb. 1, 1921.

Application filed May 19, 1920. Serial No. 382,664.

*To all whom it may concern:*

Be it known that I, WILLIAM KLABUNDE, a citizen of the United States, residing at Florence, in the county of Douglas and State of Nebraska, have invented certain new and useful Improvements in Direction-Indicators, of which the following is a specification, reference being had therein to the accompanying drawing.

The invention relates to direction indicators for automobiles, and has for its object to provide a device of this character which may be easily and quickly attached to a windshield frame and provided with a hand which may be thrown at right angles to the automobile to indicate to approaching vehicles, from the front or rear that the operator intends to make a turn, and to provide means whereby said hand may be returned to a normal position after a signaling operation. Also to provide illuminating means for illuminating the pivoted hand member at night so that it will be visible from a distance.

A further object is to provide a vehicle signal comprising a right angle member, the end of one arm of the right angle member being provided with a pivotal member having a direction indicating hand and to provide a rotatable shaft extending longitudinally and rotatable in bearings of the right angle member and having a connecting link connection with the direction indicating hand shaft so that when the rotatable shaft is rotated the direction indicating hand may be positioned at right angles to the vehicle or longitudinally therewith. Also to provide spring means for preventing the rattling of the parts and detent means for holding the direction indicating hand in its operated or normal position.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the signaling device.

Fig. 2 is a plan view.

Fig. 3 is a detail sectional view taken on line 3—3 of Fig. 2.

Referring to the drawings, the numeral 1 designates a right angle member, which comprises the arms 2 and 3. The arm 2 has secured thereto as at 4 a clamping member 5 so that the signal may be secured to the wind shield in such a manner that the arm 2 will extend longitudinally in relation to the automobile and the arm 3 outwardly at a right angle to the automobile. The arm 3 at its outer end has rotatably mounted in a bearing 6, a shaft 7. The shaft 7 having secured thereto as at 8 an arm 9. The sleeve portion of the arm 9 preventing the displacement of the vertical shaft 7, however to prevent rattling of the shaft 7 a coiled spring 10 is interposed between the lower edge of the arm 3 and a nut 11 carried by the lower end of the shaft 7. Secured to the shaft 7 is a direction indicating hand 12 which is adapted to be moved outwardly to the dotted line position shown in Fig. 1 during a signaling operation, and when not in a signaling position is disposed in the full line position shown in Fig. 1. A conventional form of electric light reflector 13 is carried by the hand 12 so that the hand may be illuminated at night from a battery 14, the current from which is controlled by means of a switch 15.

Rotatably mounted in bearings 16 of the right angle member 1 is a rockable shaft 17, one end of which is provided with an upwardly extending arm 18, which arm is connected to the arm 9 by means of a connecting rod 19. The connecting rod is prevented from rattling by means of springs 20 and the rockable shaft 17 is prevented from rattling by means of the coiled spring 21 and the boss 22 at the other end of the shaft 17. It will be seen that as the shaft 17 is rotated by grasping the handle member 23 that the hand 12 may be moved outwardly or inwardly as desired. The handle member 23 may be controlled in any suitable manner, however to prevent displacement of the hand incident to jar after it has been moved from one position to another a spring arm 24 is provided and carried by the shaft 17, the end of which is adapted to be moved into the depression 25 when the hand 12 is in the dotted line position shown in Fig. 1, and into the depression 26 when the hand is out of operation.

From the above it will be seen that a direction indicator for motor driven vehicles is provided which is simple in construction and one wherein the action is positive and the parts so provided with springs that the possibility of rattling is reduced to a minimum.

If desired a mirror 27 may be secured to the rear face of the arm 3 so that the operator may observe approaching vehicles from the rear.

The invention having been set forth what is claimed as new and useful is:—

1. A direction indicator for vehicles comprising a bracket adapted to be secured to a motor driven vehicle, a longitudinally disposed shaft rockable in bearings of said bracket, a direction indicating hand secured to a shaft rockable in a bearing of the bracket, an arm carried by the indicator hand shaft, a connecting rod between the rockable shaft arm and the arm of the longitudinally disposed rockable shaft, spring means interposed adjacent the connections between the connecting rod arms for preventing rattling, the rear end of the longitudinally disposed rod being provided with a spring detent for holding the rockable rod in position to which it may be moved and means for rocking said longitudinally disposed rockable rod.

2. The combination with an indicating hand carried by a vertically disposed rockable rod rockably mounted in a bearing of a bracket, of operating mechanism for said rockable rod, said mechanism comprising an arm carried by the rockable rod, a rockable shaft rockable in a bearing of the bracket, an arm carried by one end of the longitudinally disposed rockable rod, a connecting rod between the arms of the longitudinally disposed rockable rod and the vertically disposed rockable rod, spring means for preventing rattling of the connecting rod and the rockable rods, and detent means for holding the longitudinally disposed rockable rod to any position to which it may have been moved.

In testimony whereof I hereunto affix my signature.

WILLIAM KLABUNDE.